(12) United States Patent
Albertazzi et al.

(10) Patent No.: US 11,809,604 B2
(45) Date of Patent: Nov. 7, 2023

(54) DEFENSIBLE REGULATED ELECTRONIC COMMUNICATION DISPOSITION SYSTEM

(71) Applicant: BANK OF AMERICA CORPORATION, Charlotte, NC (US)

(72) Inventors: German Ulloa Albertazzi, Marshville, NC (US); Brian A. Blakley, Pinellas Park, FL (US); Jessica Bond, Armonk, NY (US); Bryan L. Ford, Addison, TX (US); Srinivasa Madireddi, Flower Mound, TX (US); James Charles Montagna, Charlotte, NC (US); Aarti Patel, Piscataway, NJ (US); Jerome N. Rogers, Charlotte, NC (US); Anthony Stone, Tega Cay, SC (US); Wayne Welsh, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 193 days.

(21) Appl. No.: 17/376,872

(22) Filed: Jul. 15, 2021

(65) Prior Publication Data

US 2023/0018312 A1    Jan. 19, 2023

(51) Int. Cl.
| | |
|---|---|
| *G06F 21/62* | (2013.01) |
| *G06F 21/31* | (2013.01) |
| *G06Q 50/18* | (2012.01) |
| *H04L 51/56* | (2022.01) |
| *H04L 51/222* | (2022.01) |
| *G06Q 50/00* | (2012.01) |

(52) U.S. Cl.
CPC .......... *G06F 21/6263* (2013.01); *G06F 21/31* (2013.01); *G06Q 50/00* (2013.01); *H04L 51/222* (2022.05); *H04L 51/56* (2022.05); *G06F 2221/2113* (2013.01); *G06F 2221/2141* (2013.01)

(58) Field of Classification Search
CPC ................. G06F 21/6263; G06F 21/31; G06F 2221/2113; G06F 2221/2141; H04L 51/56; H04L 51/222; G06Q 50/18
See application file for complete search history.

(56) References Cited

U.S. PATENT DOCUMENTS

| | | | | |
|---|---|---|---|---|
| 2012/0047112 A1* | 2/2012 | Steffan | .................. | G06F 16/93 707/662 |
| 2018/0357235 A1* | 12/2018 | Hallgren | ............. | G06F 16/2365 |
| 2022/0198053 A1* | 6/2022 | Madhavan | .............. | G06F 21/31 |

* cited by examiner

*Primary Examiner* — Ashokkumar B Patel
*Assistant Examiner* — William B Jones
(74) *Attorney, Agent, or Firm* — Moore & Van Allen PLLC; James C. Edwards

(57) ABSTRACT

A fully-automated, defensible and highly-scalable system for disposition decisioning and, where applicable deleting previously archived electronic communications. In this regard, the present invention is capable of determining, on an individual e-communication basis, whether an e-communication should be deleted/purged from archive or retained in archive taking into account applicable rules and policies based on the geographic location from which the e-communication was sent, received or posted, as well as, based on the status on the sender/poster and/or recipient.

17 Claims, 4 Drawing Sheets

US 11,809,604 B2

DEFENSIBLE REGULATED ELECTRONIC COMMUNICATION DISPOSITION SYSTEM

FIELD OF THE INVENTION

The present invention is generally directed to electronic communication storage and, more specifically, a fully automated and defensible process for dispositioning electronic communications.

BACKGROUND

In business/enterprise environments, a certain population of employees/users (which in some instance may constitute all of the employees/users) are deemed to be "regulated" in terms of their electronic communications (e-communications). Regulation of an employee/user may be based on the general natural nature of the employee's work and/or the type of data that the employee/user has access to (e.g., non-public information (NPI), confidential/private data or the like). The need to regulate employees/users may be based on internal policies and/or government regulations.

Regulation of employees/users requires that the e-communications that the employees/users send and receive be held in archive for a specified period of time. Such e-communications are not limited to electronic mail (i.e., email), but may also include the need to archive other forms of electronic communication, such as, but not limited to, short message service (SMS)/text messages, facsimiles, voice mail, as well as social media postings and the like.

In large enterprises in which a large percentage of, if not all, employees/users are regulated, the volume of electronic communications that require archiving is enormous. In many instances, enterprises rely on third-party entities for archiving purposes since the third-party entities are designed to handle high-volume archiving needs. As the volume of e-communications that are archived increases, so too does the amount of memory needed to archive the e-communications. Utilization of additional memory, whether it be internal or at a third-party entity, results in additional cost.

While regulations typically mandate that e-communications only be retained in archive for a specified period of time, such regulations may vary on geographic location/jurisdictional basis (i.e., country-to-country), as well as, on a personal basis (i.e., employee-to-employee). As a result, in large enterprises that have a worldwide presence, the deletion, otherwise referred to as destruction or purging, or e-communications becomes a daunting task. While indefinitely retaining all of the e-communications sent and received by regulated employees/user is an option (and one which many enterprises employ), such a practice is not desirable since, not only do storage costs escalate, but operational misappropriation can incurred by having access to data that is no longer legally required to be stored/archived.

Therefore, a need exists to develop systems, methods, computer program products and the like that provide for a fully-automated and defensible means for dispositioning regulated and archived e-communications. In this regard, the desired systems, methods, computer program products and the like should be able to intelligently and accurately determine, on an individual e-communication basis, whether an e-communication can be deleted/purged from archive or whether the e-communication should be further retained in archive taking into account rules/policies that are based on the geographic location/jurisdiction of the sender and/or recipient and individual sender and/or recipient regulatory status. Further, the desired systems, methods, computer program products and the like should accommodate dispositioning of regulated e-communications across large enterprises and the like, which archive millions of electronic communications on a daily basis and, thus, have a desire and/or need to delete/purge similar volumes of e-communications on a daily basis.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a fully automated and defensible means for dispositioning previously archived electronic communications (i.e., e-communications). In this regard, the present invention is capable of determining, on an individual e-communication basis, whether an e-communication should be deleted/purged from archive or retained in archive.

The present invention is especially suited to accommodate the needs of large enterprises, which have employees worldwide. In this regard, the present invention, makes disposition decisions based on applicable rules and policies that take into account the fact that retention periods vary based on the geographic location (i.e., country) from which the e-communication was sent, received or posted, as well as, based on the status on the sender/poster and/or recipient. Moreover, the present invention is capable of handling the disposition decisioning and, where applicable, deletion/purging of high volumes of e-communications, as incurred by large enterprises.

Further, the present invention, not only fully automates the disposition decisioning process, but also, where applicable, initiates and confirms the deletion/purging process to ensure that e-communications determined to require deletion/purging, are in fact, deleted/purged from the archive.

As a result of the intelligent and automated disposition decisioning and, where applicable, deletion/purging of e-communications from archive, the present invention is able to limit storage costs related to arching of e-communications and limit operation misappropriation by eliminating the storage/archiving of e-communications that no longer require such.

A system for defensible electronic communication (e-communication) disposition defines first embodiments of the invention. The system includes a first computing platform having a first memory and one or more processing devices in communication with the first memory. The first memory stores e-communication deletion candidate determination instructions that are executable by the one or more processing devices. The instructions are configured to receive, from an e-communication archiving system, metadata for each of a plurality of e-communications. The metadata includes (i) an e-communication identifier, (ii) a sender of the e-communication, (iii) one or more recipients of the e-communication, and (iv) a date on which the e-communication was sent or posted. The instructions are further configured to identify, for each of the plurality of e-communications, (v) an identifier for at least one of the sender and the one or more recipients, and (vi) a geographic work location for the at least one of the sender and the one or more recipients. Further, the instructions are configured to generate and initiate communication of an e-communication deletion candidate file that lists at least a portion of the plurality e-communications as e-communication deletion candidates and includes, for each listed e-communication, (i)-(vi).

The system additionally includes a second computing platform including a second memory and one or more second processing devices. The second memory stores e-communication deletion disposition determination instructions that are executable by the one or more second processing devices. The instructions are configured to receive the e-communication deletion candidate file from the first computing platform, and apply a plurality of rules and policies to each of the e-communication deletion candidates in the e-communication deletion candidate file to determine, for each of the e-communications, based on (i)-(vi), a disposition decision. The plurality of rules and policies include at least (a) legal hold status of the at least one of the sender and the one or more recipients, and (b) deletion requirements of the geographic work location of the at least one of the sender and the one or more recipients. The disposition decision includes one of (1) delete the e-communication from within e-communication archiving system or (2) retain the e-communication within the e-communication archiving system. The instructions are further configured to communicate a disposition decision file to the first computing platform. The disposition decision file lists the electronic communications based on the e-communication identifier and includes a corresponding disposition decision.

In further specific embodiments of the system, the first memory of the first computing platform further stores e-communication deletion candidate throttling instructions that are executable by the one or more first processing devices. These instructions are configured to determine current processing demands on the one or more second processing devices executing the e-communication deletion disposition determination instructions based on a first volume of e-communication deletion candidates communicated to the second computing platform in comparison to a second volume of disposition decisions received at the first computing platform. In addition, these instructions are configured to throttle a volume of e-communication deletion candidates to be communicated to the second computing platform based on the current processing demands on the one or more second processing devices.

In other specific embodiments of the system, the first memory of the first computing platform further stores e-communication deletion task instructions that are executable by the one or more first processing devices and configured to format e-communication deletion task instructions into a format acceptable to the e-communication archiving system. In such embodiments of the system, the format e-communication deletion task instructions are further configured to (i) identify one or more e-communication deletion files for inclusion in an e-communication deletion task, (ii) select parameters for the e-communication deletion task, authorize the deletion task, and (iii) submit the deletion task to the e-communication archiving system. In related embodiments of the system, the first computing platform (i) receives e-communication deletion data from the e-communication archiving system that indicates which e-communications associated with the deletion task were deleted and which e-communications associated with the deletion task were unable to be deleted, and (ii) generates and communicates an e-communication deletion confirmation file, to the second computing platform, which includes e-communications that were deleted and e-communications that were unable to be deleted.

In still further specific embodiments of the system, the e-communication deletion candidate determination instructions are further configured to identify the identifier for at least one of the sender and the one or more recipients by accessing a unified user directory that lists identifiers of users based on corresponding e-communication addresses and identify the geographic work location for the at least one of the sender and the one or more recipients by accessing an enterprise-wide reference data repository that lists geographic work locations based on the identifiers of the users.

In additional specific embodiments of the system, the e-communication deletion candidate determination instructions are further configured to receive the metadata for each of the plurality of e-communications, which are further defined as regulated e-communications sent or received by users having a regulated status that is based on a user's requirement to process non-public information. In additional specific embodiments of the system, the e-communication deletion candidate determination instructions are further configured to receive the metadata for each of the plurality of e-communications, which meet a minimum predetermined time requirement for storage within the e-communication archiving system.

Moreover, in further specific embodiments of the system, the e-communication deletion candidate determination instructions are further configured to receive the metadata for each of the plurality of e-communications, including retry e-communications which are categorized as one of (i) e-communications that were previous disposition decisioned by the communication deletion disposition determination instructions as requiring retention of the e-communication within the e-communication archiving system, (ii) e-communications that were previously dispositioned for deletion and the e-communication archiving system were unable to be deleted, and (iii) e-communications that were previous disposition decisioned by the communication deletion disposition determination instructions as requiring deletion of the e-communication within the e-communication archiving system and a time period for conducting and confirming deletion has expired.

In other specific embodiments of the system, the e-communications include (i) electronic mail (email), (ii) short message service/text messages, (iii) facsimiles, (iv) voice mail and/or (v) social media postings.

A computer-implemented method for defensible electronic communication (e-communication) disposition defines second embodiments of the invention. The method is executed by one or more processing devices. The method includes receiving, from an e-communication archiving system, metadata for each of a plurality of e-communications. The metadata includes (i) an e-communication identifier, (ii) a sender of the e-communication, (iii) one or more recipients of the e-communication, and (iv) a date on which the e-communication was sent or posted. The method further includes identifying, for each of the plurality of e-communications, (v) an identifier for at least one of the sender and the one or more recipients, and (vi) a geographic work location for the at least one of the sender and the one or more recipients. Further, the method includes generating an e-communication deletion candidate file that lists at least a portion of the plurality e-communications as e-communication deletion candidates and includes, for each listed e-communication, (i)-(vi). In addition, the method includes applying a plurality of rules and policies to each of the e-communication deletion candidates in the e-communication deletion candidate file to determine, for each of the e-communications, based on (i)-(vi), a disposition decision, wherein the plurality of rules and policies include at least (a) legal hold status of the at least one of the sender and the one or more recipients, and (b) deletion requirements of the geographic work location of the at least one of the sender and the one or more recipients. The disposition decision includes one of delete the e-communication from within e-communication archiving system or retain the e-communication within the e-communication archiving system. Moreover, the method includes generating a disposition decision file, wherein the disposition decision file lists the electronic communications based on the e-communication identifier and includes a corresponding disposition decision.

In specific embodiments the computer-implemented method further includes (i) determining current processing demands for determining disposition decisions based on a first volume of e-communication deletion candidates in e-communication deletion candidate files submitted for disposition decisions in comparison to a second volume of disposition decisions in disposition decision files, and (ii) throttling a third volume of e-communications deletion candidates to be disposition decisioned based on the current processing demands on the one or more second processing devices.

In other specific embodiments the computer-implemented method further includes, in response to communicating a deletion task e-communication archiving system based on deletion disposition decisions in one or more disposition decision files, receiving e-communication deletion data from the e-communication archiving system that indicates which e-communications associated with the deletion task were deleted and which e-communications associated with the deletion task were unable to be deleted. Further, the computer-implemented method includes generating an e-communication deletion confirmation file, which includes e-communications that were deleted and e-communications that were unable to be deleted.

In still further specific embodiments of the computer-implemented method, identifying the identifier further includes accessing a unified user directory that lists identifiers of users based on corresponding e-communication addresses and identifying the geographic work location further includes accessing an enterprise-wide reference data repository that lists geographic work locations based on the identifiers of the users.

Moreover, in other specific embodiments of the computer-implemented method, the e-communications (i) are defined as regulated e-communications sent or received by users having a regulated status, wherein the regulated status is based on a user's requirement to process non-public information, and/or (ii) meet a minimum predetermined time requirement for storage within the e-communication archiving system.

A computer program product including a non-transitory computer-readable medium defines third embodiments of the invention. The computer-readable medium includes a first set of codes for causing a computer to receive, from an e-communication archiving system, metadata for each of a plurality of e-communications. The metadata includes (i) an e-communication identifier, (ii) a sender of the e-communication, (iii) one or more recipients of the e-communication, and (iv) a date on which the e-communication was sent or posted. The computer-readable medium further includes a second set of codes for causing a computer to identify, for each of the plurality of e-communications, (v) an identifier for at least one of the sender and the one or more recipients, and (vi) a geographic work location for the at least one of the sender and the one or more recipients. In addition, the computer-readable medium includes a third set of codes for causing a computer to generate an e-communication deletion candidate file that lists at least a portion of the plurality e-communications as e-communication deletion candidates and includes, for each listed e-communication, (i)-(vi). Additionally, the computer-readable medium includes a fourth set of codes for causing a computer to apply a plurality of rules and policies to each of the e-communication deletion candidates in the e-communication deletion candidate file to determine, for each of the e-communications, based on (i)-(vi), a disposition decision. The plurality of rules and policies include at least (a) legal hold status of the at least one of the sender and the one or more recipients, and (b) deletion requirements of the geographic work location of the at least one of the sender and the one or more recipients. The disposition decision includes one of delete the e-communication from within e-communication archiving system or retain the e-communication within the e-communication archiving system. Moreover, the computer-readable medium includes a fifth set of codes for causing a computer to generate a disposition decision file. The disposition decision file lists the electronic communications based on the e-communication identifier and includes a corresponding disposition decision.

In specific embodiments of the computer program product, the computer-readable medium further includes a sixth set of codes for causing a computer to determine current processing demands for determining disposition decisions based on a first volume of e-communication deletion candidates in e-communication deletion candidate files submitted for disposition decisions in comparison to a second volume of disposition decisions in disposition decision files, and a seventh set of codes for causing a computer to throttle a third volume of e-communications deletion candidates to be disposition decisioned based on the current processing demands on the one or more second processing devices.

In other specific embodiments of the computer program product, the computer-readable medium further includes a sixth set of codes for causing a computer to, in response to communicating a deletion task e-communication archiving system based on deletion disposition decisions in one or more disposition decision files, receive e-communication deletion data from the e-communication archiving system that indicates which e-communications associated with the deletion task were deleted and which e-communications associated with the deletion task were unable to be deleted, and a seventh set of codes for causing a computer to generate an e-communication deletion confirmation file which includes e-communications that were deleted and e-communications that were unable to be deleted.

In other specific embodiments of the computer program product, the second set of codes are further configured to cause the computer to identify the identifier by accessing a unified user directory that lists identifiers of users based on corresponding e-communication addresses and identify the geographic work location by accessing an enterprise-wide reference data repository that lists geographic work locations based on the identifiers of the users.

In still further specific embodiments of the computer program product, the e-communications (i) are defined as regulated e-communications sent or received by users having a regulated status, wherein the regulated status is based on a user's requirement to process non-public information, and/or (ii) meet a minimum predetermined time requirement for storage within the e-communication archiving system.

Thus, according to embodiments of the invention, which will be discussed in greater detail below, the present invention provides for needs and/or achieve other advantages by providing for a fully automated and defensible means for dispositioning previously archived electronic communications (i.e., e-communications). In this regard, the present invention is capable of determining, on an individual e-communication basis, whether an e-communication should be deleted/purged from archive or retained in archive. As a result of the intelligent and automated disposition decisioning and, where applicable, deletion/purging of e-communications from archive, the present invention is able to limit storage costs related to arching of e-communications and limit operation misappropriation by eliminating the storage/archiving of e-communications that no longer require such.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
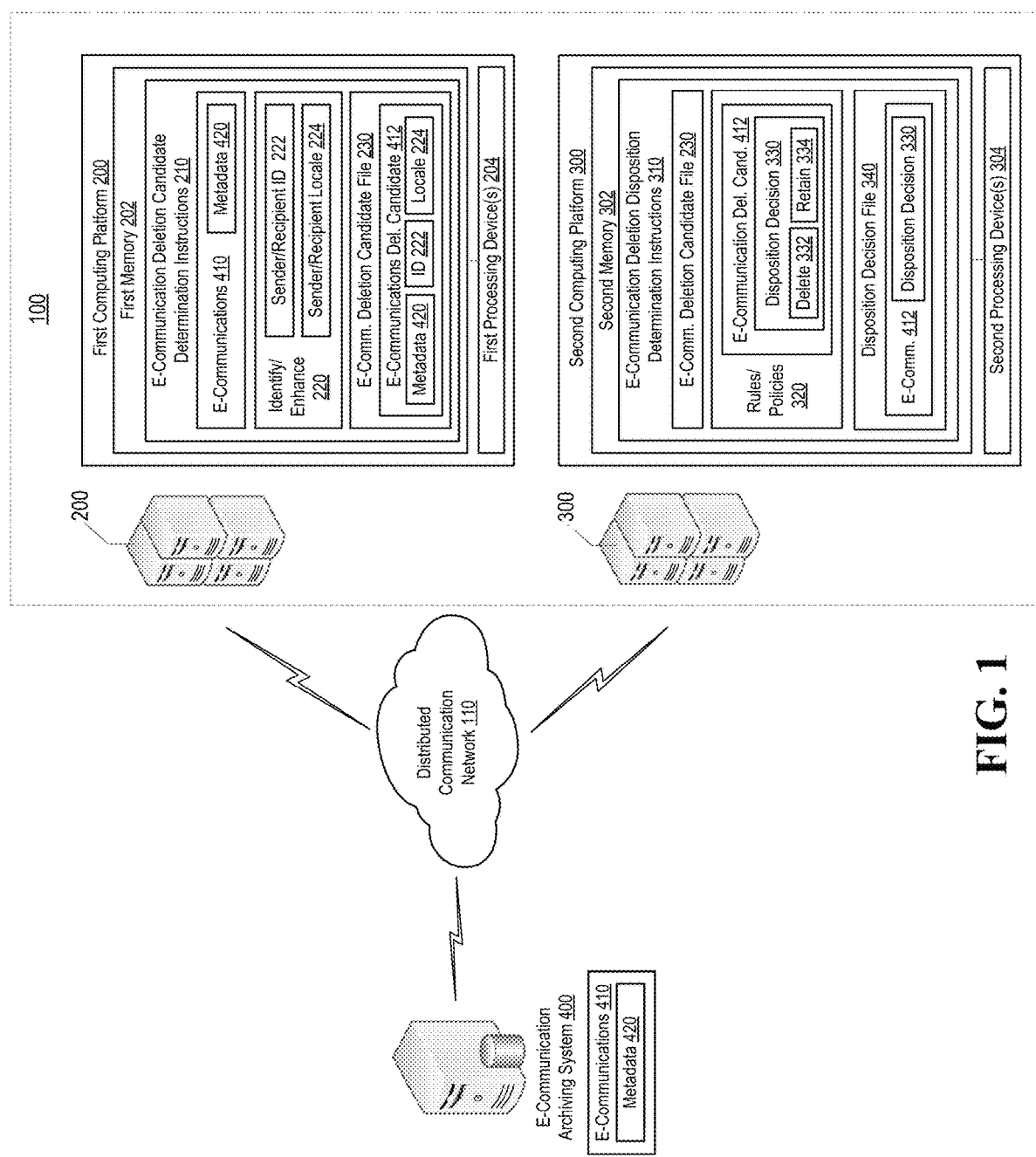
Figure 2:
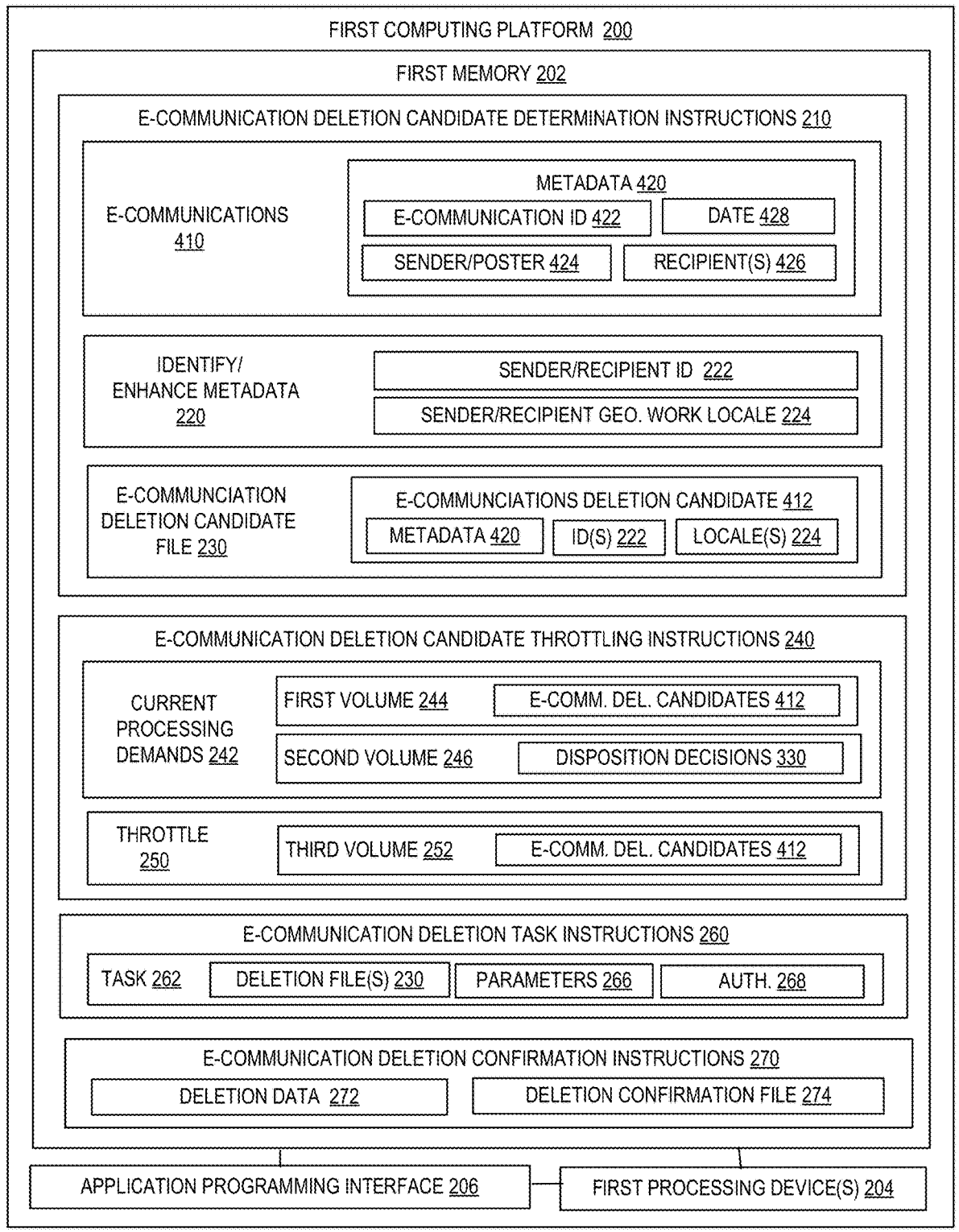
Figure 3:
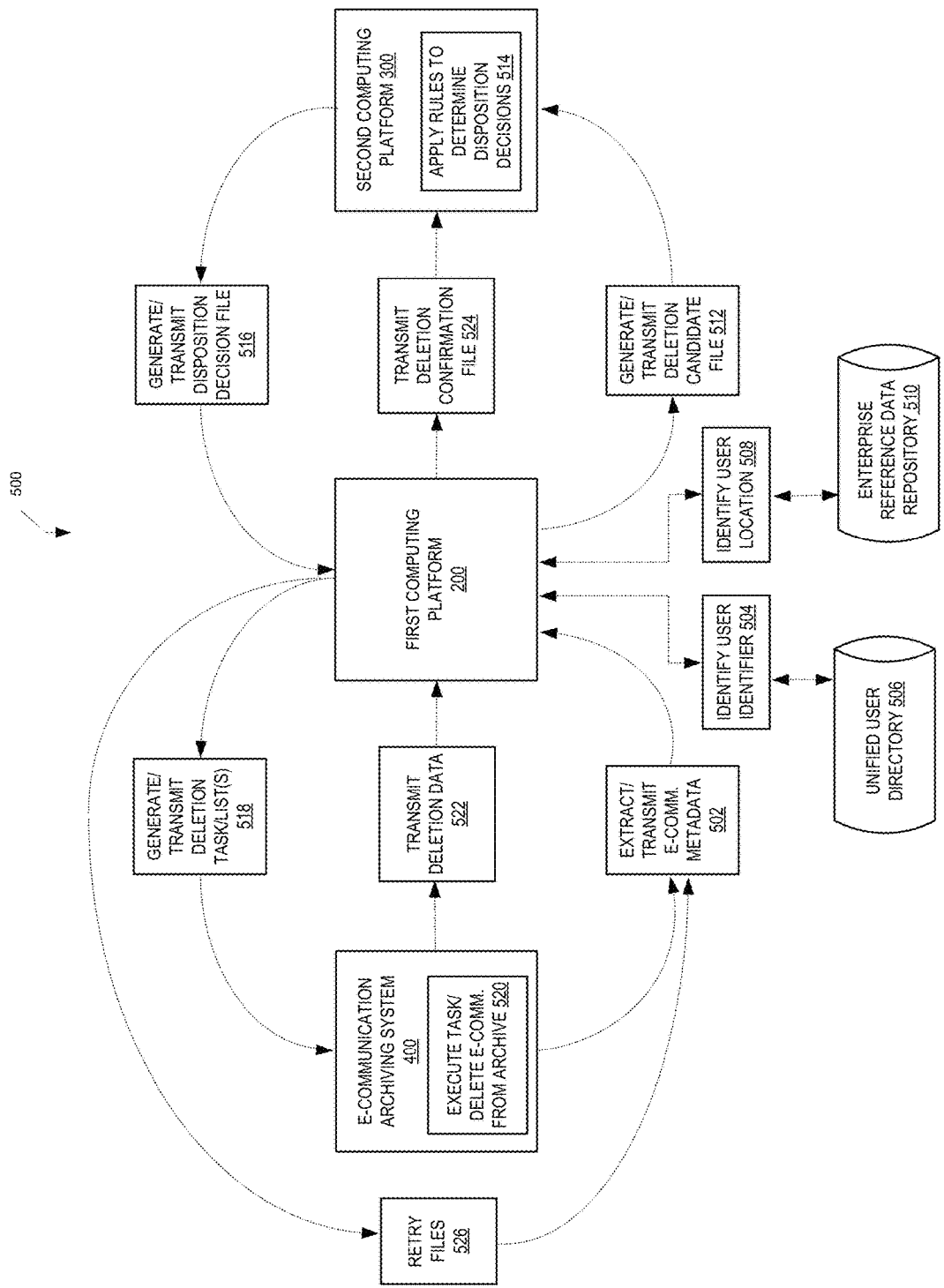
Figure 4:
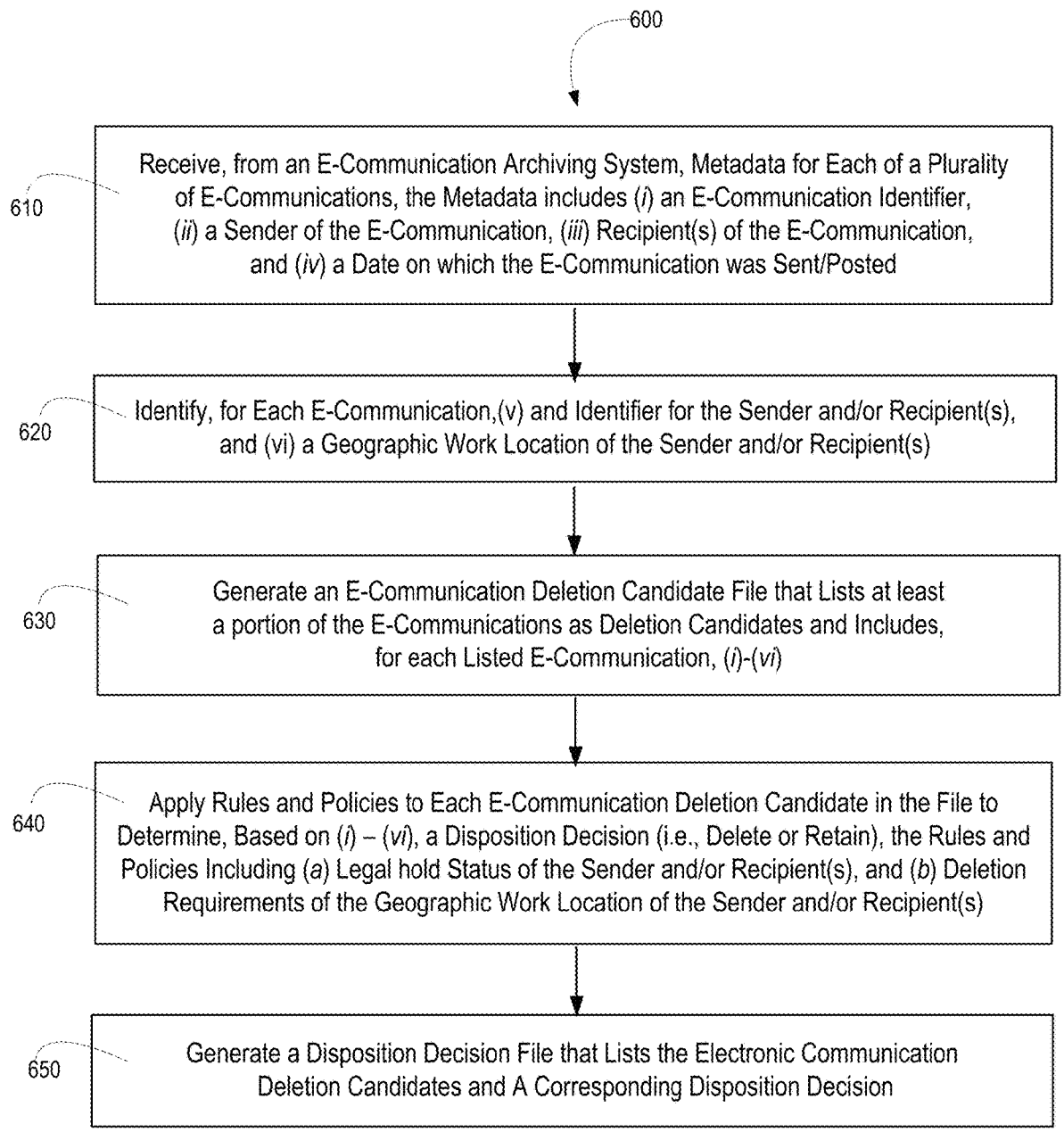

Having thus described embodiments of the disclosure in general terms, reference will now be made to the accompanying drawings, wherein:

FIG. 1 is a schematic/block diagram of a system for fully automated and defensible dispositioning of regulated and archived electronic communications, in accordance with embodiments of the present invention;

FIG. 2 is a schematic/block diagram of a block diagram of a first computing platform configured for orchestrating the dispositioning of regulated and archived electronic communications, in accordance with embodiments of the present invention;

FIG. 3 is a schematic/flow diagram of a system and method for fully automated and defensible dispositioning of regulated and archived electronic communications, in accordance with embodiments of the present invention;

FIG. 4 is a flow diagram of a methodology for fully automated and defensible dispositioning of regulated and archived electronic communications, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for a fully automated and defensible means for dispositioning previously archived electronic communications (i.e., e-communications). In this regard, the present invention is capable of determining, on an individual e-communication basis, whether an e-communication should be deleted/purged from archive or retained in archive.

The present invention is especially suited to accommodate the needs of large global enterprises, which have employees worldwide and require archiving of a massive amount of e-communications. In this regard, the present invention provides the capability to process high volumes of disposition decisions, and, where applicable, authorize and orchestrate the deletion/purging of such high-volume e-communications on a daily basis. Further, the present invention makes disposition decisions based on applicable rules and policies that take into account the fact that retention periods vary based on the geographic location (i.e., country) from which the e-communication was sent, received or posted, as well as, based on the status on the sender/poster and/or recipient.

Further, the present invention, not only fully automates the disposition decisioning process, but also, where applicable, initiates and confirms the deletion/purging process to ensure that e-communications determined to require deletion/purging, are in fact, deleted/purged from the archive.

As a result of the intelligent and automated disposition decisioning and, where applicable, deletion/purging of e-communications from archive, the present invention is able to limit storage costs related to arching of e-communications and limit operation misappropriation by eliminating the storage/archiving of e-communications that no longer require such.

Referring to FIG. 1 a schematic diagram of an exemplary system for fully automated and intelligent disposition decisioning of archived e-communications, in accordance with embodiments of the present invention. The system 100 includes a first computing platform 200 having a first memory 202 and one or more first processing devices 204 in communication with the first memory 202. First memory 202 stores e-communication deletion candidate determination instructions 210, which are executable by the first processing device(s) 204. E-communication deletion candidate determination instructions 210 are configured to receive, from e-communication archiving system 400 via distributed communication network 110 (e.g., the Internet, one or more intranets and/or the like), the metadata 420 associated with a plurality of e-communications 410. The e-communications 410 may include, but are not limited to, electronic mail (i.e., email), Short Message Service (SMS)/text messages, facsimiles, voice mail, social media posts and the like. In specific embodiments of the invention, the e-communications are defined as regulated e-communications that have been sent or received by designated (or in some, instances, all) individuals/employees within an enterprise (i.e., regulated employees). In specific instances, e-communications sent or received by the designated employees may be regulated based on the designated employees' access to or handling of non-public information (NPI), such as private/confidential information.

The metadata 420 includes any portion of the e-communication 410 other than the body of the e-communication, such as, but not limited to, (i) an e-communication identifier, (ii) the sender/poster of the e-communication (e.g., sender email address, telephone number or the like), (iii) the recipient(s) of the e-communication (e.g., recipient email address, telephone number or the like), and (iv) a date on which the e-communication was sent.

Moreover, the metadata 420 that is received is associated with e-communications that have been stored in the archiving system 400 for at least a predetermined period of time, which will vary based on the requirements of the enterprise. For example, in an enterprise having a five year archiving requirements, the e-communications 410 will be stored in the archiving system 400 a minimum of five years before the metadata 420 of such e-communications 410 is received at the first computing platform 200 (i.e., before such e-communications undergo disposition decisioning to determine whether the e-communication 410 can be deleted/purged or should be retained in the e-communication archiving system 400).

In response to receiving the metadata 420, the e-communication deletion candidate determination instructions 210 are configured to identify 220 (i.e., enhance the metadata 420), for each of the plurality of e-communications 410, (i) an identifier 222 for at least one of the sender and one or more of the recipients, and (ii) a geographic work locale 224 (i.e., jurisdiction, such as, country or the like) for at least one of the sender and one or more of the recipients. In specific embodiments of the system 100, the identifier 22 is determined by accessing a unified employee directory or the like that cross-references email addresses to identifiers 222. In addition, in specific embodiments of the system 100, the geographic work locale 224 is identified by accessing an enterprise-wide reference data repository or the like that cross-references email addresses and/or identifiers 222 to the geographic work locale 224.

In response to identifying (i) the identifiers 222, and (ii) geographic work locales 224, the e-communication deletion candidate determination instructions 210 are configured to generate and initiate communication of an e-communication deletion candidate file 230 that lists at least a portion of the e-communications as e-communication deletion candidates 412 and includes the corresponding metadata 420 received from the e-communication arching system 400 and corresponding the identifiers 222, and geographic work locales 224.

System 100 additionally includes a second computing platform 300 having a second memory 302 and one or more second processing devices 304 in communication with the second memory 302. Second memory 202 stores e-communication deletion disposition determination instructions 310 that are configured to receive the e-communication deletion candidate file 230 from the first computing platform 200 and, in response, apply a plurality of rules and/or policies 320 to each of the e-communication deletion candidates 412 in the file 230 to determine, based on the metadata 420, the identifiers 222 and/or the geographic work location 224, a disposition decision 330. The disposition decision 330 is one of authorization to delete 332 the e-communication 412 or retain 334 the e-communication 412 in the archiving system 400. According to specific embodiments of the system 100, the rules and/or policies 320 include, but are not limited to, (i) legal hold status of the at least one of the sender or one of the recipients and (ii) deletion requirements of the geographic work location of at least one of the sender or one of the recipients. Legal hold status, deletion requirements of the geographic work location and/or other rules and/or policies 320 may override the minimum predetermined period time for which a e-communication must be retained.

In response, to determining a disposition decision 330 for each of the e-communications 412, e-communication deletion disposition determination instructions 310 that are configured to generate and initiate communication of a disposition decision file 340 to the first computing platform 200. The disposition decision file 340 lists the e-communications 412, according to their respective identifier 222 and their corresponding disposition decision 330. As discussed infra., the first computing platform 200 will include instructions for generation deletion tasks that are communicated to the archiving system 400 and result in automated deletion/purging of the designated e-communications from the shriving system 400. It should be noted that the e-communications 412 dispositioned for deletion are required to be deleted within a predetermined period of time. As will be discussed infra., in the event that the e-communications 412 dispositioned for deletion are not deleted within the predetermined period of time, the e-communications are retained within the archiving system 200 until a subsequent dispositioning retry is attempted.

Referring to FIG. 2, a block diagram is depicted of first computing platform 200, in accordance with embodiments of the present invention. In addition to providing greater detail, FIG. 2 highlights various alternate embodiments of the system 200. First computing platform 200, which acts as the orchestration module for the deletion dispositioning and deletion request processes, comprises one or more computing devices/apparatus, such as application server(s), storage servers or the like configured to execute software programs, including instructions, engines, algorithms, modules, routines, applications, tools and the like. First computing platform 200 includes first memory 202, which may comprise volatile and non-volatile memory, such as read-only and/or random-access memory (RAM and ROM), EPROM, EEPROM, flash cards, or any memory common to computer platforms). Moreover, first memory 202 may comprise cloud storage, such as provided by a cloud storage service and/or a cloud connection service.

Further, first computing platform 200 also includes first processing device(s) 204, which may be an application-specific integrated circuit ("ASIC"), or other chipset, logic circuit, or other data processing device. First processing device 204 may execute an application programming interface ("API") 206 that interfaces with any resident programs, such as e-communication deletion candidate instructions, 210, e-communication deletion candidate throttling instructions 240, e-communication deletion task instructions 260 and sub-engines/routines associated therewith or the like stored in the first memory 202 of the first computing platform 200.

First processing device 204 may include various processing subsystems (not shown in FIG. 2) embodied in hardware, firmware, software, and combinations thereof, that enable the functionality of first computing platform 200 and the operability of first computing platform 200 on distributed communication network 110 (shown in FIG. 1). For example, processing subsystems allow for initiating and maintaining communications and exchanging data with other networked devices. For the disclosed aspects, processing subsystems of first processing device 304 may include any subsystem used in conjunction with e-communication deletion candidate instructions, 210, e-communication deletion candidate throttling instructions 240, e-communication deletion task instructions 260, e-communication deletion confirmation instructions 270 and related sub-engines/routines, algorithms, sub-algorithms, modules, sub-modules thereof.

First computing platform 200 additionally includes a communications module (not shown in FIG. 2) embodied in hardware, firmware, software, and combinations thereof, that enables electronic communications between first computing platform 200 and other networks and/or networked devices, such as e-communication archiving system 400 and second computing platform 300. Thus, the communication module may include the requisite hardware, firmware, software and/or combinations thereof for establishing and maintaining a network communication connection with one or more systems, platforms, networks, or the like.

As previously discussed in relation to FIG. 1, first memory 202 of computing platform 200 stores e-communication deletion candidate instructions, 210 that is executable by the first processing device(s) 304 and configured to provide e-communication deletion candidates to the disposition decisioning computing platform (i.e., second computing platform 300). Specifically, e-communication deletion candidate determination instructions 210 are configured to receive, from e-communication archiving system 400, the metadata 420 associated with a plurality of e-communications 410. The metadata 420 includes any portion of the e-communication 410 other than the body of the e-communication, such as, but not limited to, (i) an e-communication identifier 422, (ii) the sender/poster 424 of the e-communication (e.g., sender email address, telephone number or the like), (iii) the recipient(s) 426 of the e-communication (e.g., recipient email address, telephone number or the like), and (iv) a date 428 on which the e-communication was sent.

In response to receiving the metadata 420, the e-communication deletion candidate determination instructions 210 are configured to identify 220 (i.e., enhance the metadata 420), for each of the plurality of e-communications 410, (i) an identifier 222 for at least one of the sender and one or more of the recipients, and (ii) a geographic work locale 224 (i.e., jurisdiction, such as, country or the like) for at least one of the sender and one or more of the recipients. As previously discussed, in specific embodiments of the system 100, the identifier 22 is determined by accessing a unified employee directory or the like that cross-references email addresses to identifiers 222. In addition, in specific embodiments of the system 100, the geographic work locale 224 is identified by accessing an enterprise-wide reference data repository or the like that cross-references email addresses and/or identifiers 222 to the geographic work locale 224.

In response to identifying (i) the identifiers 222, and (ii) geographic work locales 224, the e-communication deletion candidate determination instructions 210 are configured to generate and initiate communication of an e-communication deletion candidate file 230 that lists at least a portion of the e-communications as e-communication deletion candidates 412 and includes the corresponding metadata 420 received from the e-communication arching system 400 and corresponding the identifiers 222, and geographic work locales 224.

In specific embodiments of the invention, first memory 202 of first computing platform 200 additionally includes e-communication deletion candidate throttling instructions 240, which are executable by the first processing device(s) 204. E-communication deletion candidate throttling instructions 240 are configured to determine current processing state/demand on the second processing devices 304 executing the e-communication destruction disposition determination instructions 310 (shown in FIG. 1). In specific embodiments of the invention, such a determination is based on comparing a first volume 244 of e-communication destruction candidates 412, which have currently been communicated to second computing platform 300 to a second volume 246 of disposition decisions 330 received at the first computing platform 200 (i.e., based on the volume of disposition decisions that are currently outstanding). In response to the determination of the current processing state at the second computing platform 300, a third volume 252 of e-communication deletion candidates 412 to be communicated to the second computing platform 300 are throttled 250 based on the current processing demands on the second processing device(s) 304. In other words, if the current processing demands on the second processing devices 304 are high (e.g., exceed a predetermined threshold), a delay is incurred in communicating further e-communication deletion candidates to the second computing platform 300. The delay may be configured to last until a determination is made that the current processing demands at the second processing device(s) 304 have returned to normal. However, if the current processing demands on the second processing device(s) are low/normal, e-communication deletion candidates are authorized to be communicated to the second computing platform 300.

In other specific embodiments of the invention, the first memory 202 of first computing platform 200 additionally includes e-communication deletion task instructions 260, which are executable by the first processing device(s) 204. E-communication deletion task instructions 260 are configured to generate/format e-communication deletion tasks 262 that are formatted into a format that is accepted by the archiving system 400 and configured so that automated deletion/purging of the e-communications ensues upon receipt of the deletion tasks 262. In specific embodiments of the invention, generating/formatting the deletion task 262 includes identifying one or more e-communication deletion files 230 for inclusion in the deletion task 262, selecting deletion parameters 266 for the deletion task 262 and authorizing 268 the deletion task 262. In response to generating/formatting the deletion task 262, the deletion task 262 is submitted to the e-communication archiving system 400, where automated deletion/purging of the e-communications listed in the deletion file(s) 230 ensues.

In still further specific embodiments of the invention, the first memory 202 of first computing platform 200 additionally includes e-communication deletion confirmation instructions 270, which are executable by the first processing device(s) 204. E-communication deletion confirmation instructions 260 are configured to, in response to the archiving system 400 completing a deletion task 262, receive deletion data 272 from the archiving system, such as volume of e-communications successfully deleted/purged, volume of e-communications that failed to be deleted/purged and encrypted e-communication identifiers of e-communications that failed to be deleted. In response to receiving the deletion data 272, e-communication deletion confirmation instructions 270 are configured to generate and initiate communication of a deletion confirmation file 274 to the second computing platform 300.

Referring to FIG. 3, a schematic/flow diagram is presented of the methodology 500 for dispositioning decision e-communication deletion candidates and subsequently deleting/purging e-communication dispositioned for deletion/purge, in accordance with embodiments of the present invention. At Event 502, metadata is extracted, at the archiving system 400 from e-communications that meet deletion candidate criteria (e.g., held in archive for more than a predetermined period of time) and the metadata is communicated to the first computing platform 200. The first computing platform 200 is configured to act as an orchestrator for the disposition decisioning and deletion/purge processes.

At Event 504, the first computing platform 200 enhances the metadata by identifying user identifiers (IDs) for the sender and/or recipient(s) of the e-communications associated with the metadata. In specific embodiments of the invention, the user identifiers are identified by accessing a unified directory 506 that cross-references email addresses to user IDs. At Event 508, the metadata is further enhanced by user work location data (i.e., geographic work locale) for the sender and/or recipient(s) of the e-communications associated with the metadata. In specific embodiments of the invention, the work location data is identified by accessing an enterprise-wide reference data repository 510 or the like that cross-references email addresses and/or user IDs to the user's work location.

At Event 512, a deletion candidate file is generated, which lists e-communication deletion candidates and includes the metadata, the user IDs and the user work locations, and the file is transmitted to the second computing platform 300. As previously discussed, the first computing platform 200 may, in specific embodiments of the invention, throttle/delay the transmission of deletion candidates files to the second computing platform 300 based on the current processing demands/state of the second computing platform 300.

At Event 514, the second computing platform 300 applies rules and policies to each of the e-communication deletion candidates to determine, based on the metadata, the user IDs and/or the user work location data, disposition decisions for each of the e-communication deletion candidates. The disposition decision is one of (a) authorize deletion/purging of the e-communication from the archiving system, or (b) retain the e-communication in the archiving system until results of a subsequent dispositioning decisions. The rules and policies that are applied to the e-communications include, but are not limited to, (i) legal hold status determination, and (ii) disposition requirements applicable to the user work location. In response to determining the dispositioning decisions, at Event 516, the second computing platform 300 generates a disposition decision file, which includes a list of disposition deletion candidates and their corresponding disposition decision, and the file is transmitted to the first computing platform 200. In specific embodiments of the invention, e-communications dispositioned for deletion are required to be deleted/purged from the archive within a predetermined period of time.

At Event 518, the first computing platform 200 generates deletion tasks that are formatted specifically for the archiving system 400 at which the e-communications are archived and deletion/purge will occur. The deletion tasks are specifically designated threads that are executed at the archiving system to automatically delete/purge the e-communications from the archiving system 400. In specific embodiments of the invention the deletion tasks includes one or more deletion lists which includes e-communications that have been authorized for deletion (i.e., dispositioned for deletion). The deletion tasks additionally include selected deletion parameters and deletion authorization.

At Event 520, the archiving system 400 receives and executes the deletion tasks to delete/purge the designated e-communications form the archiving system, and, At Event 522, transmits deletion data back to the first computing platform 200. The deletion data includes, but is not limited to, the volume of e-communications deleted, the volume of e-communications which fail the deletion process and the encrypted identifiers for the e-communications that failed the deletion process. At Event 524, the first computing platform 200 generates a deletion confirmation, which includes the deletion data and transmits the deletion confirmation to the second computing platform.

At Event 526, the archiving system is configured to generate and communicate retry files that include the metadata for e-communications that have previously undergone the disposition decisioning process. The retry files may include (i) e-communication candidates dispositioned for deletion but were not deleted due to the expiration date for deletion having lapsed; (ii) e-communication candidates dispositioned for retention/preservation, and (iii) e-communications on a deletion list that failed the deletion process at the archiving system. Retry files are generated periodically in accordance with rules that dictate the timing based on the type of e-communications (i.e., (i)-(iii) in the file. In other embodiments of the invention, the initial file of metadata (i.e., Event 502) transmitted to the first computing platform 200 may be configured to include retry e-communications, thus, in those embodiments, obviating the need for separate retry files.

Referring to FIG. 4, a flow diagram is depicted of a method 600 for e-communication disposition decisioning, in accordance with embodiments of the present invention. At Event 710, metadata associated with each of a plurality of e-communications is received from an archiving system. The e-communications may include, but are not limited to, electronic mail (i.e., email), Short Message Service (SMS)/text messages, facsimiles, voice mail, social media posts and the like. The metadata includes any portion of the e-communication 410 other than the body of the e-communication, such as, but not limited to, (i) an e-communication identifier, (ii) the sender/poster of the e-communication (e.g., sender email address, telephone number or the like), (iii) the recipient(s) of the e-communication (e.g., recipient email address, telephone number or the like), and (iv) a date on which the e-communication was sent.

At Event 620, in response to receiving the metadata, (i) an identifier (ID) for at least one of the sender and one or more of the recipients, and (ii) a geographic work locale for at least one of the sender and one or more of the recipients are identified (i.e., the metadata is enhanced). In specific embodiments of the method, the identifier (ID) is identified by accessing a unified employee directory or the like that cross-references email addresses to identifiers. In addition, in other specific embodiments of the method, the geographic work locale is identified by accessing an enterprise-wide reference data repository or the like that cross-references email addresses and/or identifiers to the geographic work locale.

At Event 630, an e-communication deletion candidate file is generated that lists at least a portion of the e-communications associated with the received metadata and includes, for each listed e-communication, the metadata, as well as, the identified identifier (ID) of the sender and/or recipient(s) and the geographic work location of the sender and/or recipients. In specific embodiments of the method, once the deletion candidate file is generated it is communicated to a second computing platform for subsequent disposition decisioning. In such embodiments of the method, the deletion candidate file may be throttled (i.e., communication delayed) to account for the current processing demands/state at the second computing platform.

At Event 640, rules and/or policies to each of the e-communications listed in the deletion candidate file to determine, based on the metadata, the identifiers and/or the geographic work locale, a disposition decision. The disposition decision is one of authorization to delete/purge the e-communication or retail the e-communication in the archiving system. The rules and policies include, but are not limited, (i) determining legal hold status of the senders/recipient(s), and (ii) deletion/purge requirements of the geographic work locale of the sender/recipient(s). Legal hold status of a sender/recipient prohibits deletion/purging of any e-commercials for the duration of the legal hold period. The deletion/purge requirements of a particular geographic work location (e.g., country or other jurisdiction) may extend the minimum period for archiving and result in disposition decision of e-communication retention.

At Event 650, a disposition decision file is generated that lists the electronic communication deletion candidates, typically by identifier, and their corresponding disposition decision. In further embodiments of the invention, the disposition decision files are included within deletion tasks that are generated/formatted specific to the archiving system. The deletion tasks are automatically executed at the archiving system to delete/purge the applicable e-communications in the disposition decision file.

Thus, present embodiments of the invention provide systems, methods, computer program products and/or the like for a fully automated and defensible means for dispositioning previously archived electronic e-communications. In this regard, the present invention is capable of determining, on an individual e-communication basis, whether an e-communication should be deleted/purged from archive or retained in archive. As a result of the intelligent and automated disposition decisioning and, where applicable, deletion/purging of e-communications from archive, the present invention is able to limit storage costs related to arching of e-communications and limit operation misappropriation by eliminating the storage/archiving of e-communications that no longer require such.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for defensible electronic communication (e-communication) disposition, the system comprising:

a first computing platform including a first memory and one or more processing devices in communication with the first memory, wherein the first memory stores e-communication deletion candidate determination instructions that are executable by the one or more processing devices and configured to:

receive, from an e-communication archiving system, metadata for each of a plurality of e-communications, wherein the metadata includes (i) an e-communication identifier, (ii) a sender of the e-communication, (iii) one or more recipients of the e-communication, and (iv) a date on which the e-communication was sent or posted, identify, for each of the plurality of e-communications, (v) an identifier for at least one of the sender and the one or more recipients, and (vi) a geographic work location for the at least one of the sender and the one or more recipients, and generate and initiate communication of a first e-communication deletion candidate file that lists at least a portion of the plurality e-communications as e-communication deletion candidates and includes, for each listed e-communication, (i)-(vi); and a second computing platform including a second memory and one or more second processing devices, wherein the second memory stores e-communication deletion disposition determination instructions that are executable by the one or more second processing devices and configured to:

receive the e-communication deletion candidate file from the first computing platform, apply a plurality of rules and policies to each of the e-communication deletion candidates in the e-communication deletion candidate file to determine, for each of the e-communication deletion candidates, based on (i)-(vi), a disposition decision, wherein the plurality of rules and policies include at least (a) legal hold status of the at least one of the sender and the one or more recipients, and (b) deletion requirements of the geographic work location of the at least one of the sender and the one or more recipients, wherein the disposition decision includes one of delete the e-communication from within e-communication archiving system or retain the e-communication within the e-communication archiving system, and generate and initiate communication of a disposition decision file to the first computing platform, wherein the disposition decision file lists the electronic communications and includes a corresponding disposition decision, wherein the first memory further stores e-communication deletion candidate throttling instructions that are executable by the one or more first processing devices and configured to:

determine current processing demands on the one or more second processing devices executing the e-communication destruction disposition determination instructions exceed a predetermined processing demand threshold based on a comparison between a first volume of e-communication destruction candidates communicated to second computing platform and a second volume of disposition decisions received at the first computing platform, and in response to determining that the current processing demands exceed the predetermined processing demand threshold, delay initiating communication of subsequent e-communication deletion candidate files until processing demand is determined to be below the predetermined processing demand threshold.

2. The system of claim 1, wherein the first memory of the first computing platform further stores e-communication deletion task instructions that are executable by the one or more first processing devices and configured to format e-communication deletion task instructions into a format acceptable to the e-communication archiving system.

3. The system of claim 2, wherein the e-communication deletion task instructions are further configured to:

identify one or more e-communication deletion files for inclusion in an e-communication deletion task, select parameters for the e-communication deletion task, authorize the deletion task, and submit the deletion task to the e-communication archiving system.

4. The system of claim 3, wherein the first computing platform (i) receives e-communication deletion data from the e-communication archiving system that indicates which e-communications associated with the deletion task were deleted and which e-communications associated with the deletion task were unable to be deleted, and (ii) generates and communicates an e-communication deletion confirmation file, to the second computing platform, which includes e-communications that were deleted and e-communications that were unable to be deleted.

5. The system of claim 1, wherein the e-communication deletion candidate determination instructions are further configured to identify the identifier for at least one of the sender and the one or more recipients by accessing a unified user directory that lists identifiers of users based on corresponding e-communication addresses and identify the geographic work location for the at least one of the sender and the one or more recipients by accessing an enterprise-wide reference data repository that lists geographic work locations based on the identifiers of the users.

6. The system of claim 1, wherein the e-communication deletion candidate determination instructions are further configured to receive the metadata for each of the plurality of e-communications, wherein the plurality of e-communications are further defined as regulated e-communications sent or received by users having a regulated status, wherein the regulated status is based on a user's requirement to process non-public information.

7. The system of claim 1, wherein the e-communication deletion candidate determination instructions are further configured to receive the metadata for each of the plurality of e-communications, wherein the plurality of e-communications meet a minimum predetermined time requirement for storage within the e-communication archiving system.

8. The system of claim 1, wherein the e-communication deletion candidate determination instructions are further configured to receive the metadata for each of the plurality of e-communications, wherein the e-communications include retry e-communications which are categorized as one of (i) e-communications that were previous disposition decisioned by the communication deletion disposition determination instructions as requiring retention of the e-communication within the e-communication archiving system, (ii) e-communications that were previously dispositioned for deletion and the e-communication archiving system were unable to be deleted, and (iii) e-communications that were previous disposition decisioned by the communication deletion disposition determination instructions as requiring deletion of the e-communication within the e-communication archiving system and a time period for conducting and confirming deletion has expired.

9. The system of claim 1, wherein the e-communications include (i) electronic mail (email), (ii) short message service/text messages, (iii) facsimiles, (iv) voice mail and (v) social media postings.

10. A computer-implemented method for defensible electronic communication (e-communication) disposition, the method executed by one or more processing devices and comprising:
   receiving, from an e-communication archiving system, metadata for each of a plurality of e-communications, wherein the metadata includes (i) an e-communication identifier, (ii) a sender of the e-communication, (iii) one or more recipients of the e-communication, and (iv) a date on which the e-communication was sent or posted;
   identifying, for each of the plurality of e-communications, (v) an identifier for at least one of the sender and the one or more recipients, and (vi) a geographic work location for the at least one of the sender and the one or more recipients;
   generating and submitting an e-communication deletion candidate file that lists at least a portion of the plurality e-communications as e-communication deletion candidates and includes, for each listed e-communication, (i)-(vi);
   in response to submitting the e-communication deletion candidate file, applying a plurality of rules and policies to each of the e-communication deletion candidates in the e-communication deletion candidate file to determine, for each of the e-communication deletion candidates, based on (i)-(vi), a disposition decision, wherein the plurality of rules and policies include at least (a) legal hold status of the at least one of the sender and the one or more recipients, and (b) deletion requirements of the geographic work location of the at least one of the sender and the one or more recipients, wherein the disposition decision includes one of delete the e-communication from within e-communication archiving system or retain the e-communication within the e-communication archiving system;
   generating a disposition decision file, wherein the disposition decision file lists the electronic communications and includes a corresponding disposition decision;
   determining current processing demands for determining disposition decisions exceed a predetermined processing demand threshold based on a comparison between a first volume of e-communication deletion candidates submitted for disposition decisions in comparison to a second volume of disposition decisions in one or more disposition decision files; and
   in response to determining that the current processing demands exceed the predetermined processing demand threshold, delaying submission of subsequent e-communication deletion candidate files until processing demand is determined to be below the predetermined processing demand threshold.

11. The computer-implemented method of claim 10, further comprising:
   communicating a deletion task to the e-communication archiving system based on deletion disposition decisions in one or more disposition decision files
   in response to communicating the deletion task, receiving e-communication deletion data from the e-communication archiving system that indicates which e-communications associated with the deletion task were deleted and which e-communications associated with the deletion task were unable to be deleted; and
   generating an e-communication deletion confirmation file, which includes e-communications that were deleted and e-communications that were unable to be deleted.

12. The computer-implemented method of claim 10, wherein identifying the identifier for at least one of the sender and the one or more recipients further comprises accessing a unified user directory that lists identifiers of users based on corresponding e-communication addresses and identifying the geographic work location for the at least one of the sender and the one or more recipients further comprises accessing an enterprise-wide reference data repository that lists geographic work locations based on the identifiers of the users.

13. The computer-implemented method of claim 10, wherein the plurality of e-communications (i) are defined as regulated e-communications sent or received by users having a regulated status, wherein the regulated status is based on a user's requirement to process non-public information, and (ii) meet a minimum predetermined time requirement for storage within the e-communication archiving system.

14. A computer program product comprising:
   a non-transitory computer-readable medium comprising:
      a first set of codes for causing a computer to receive, from an e-communication archiving system, metadata for each of a plurality of e-communications, wherein the metadata includes (i) an e-communication identifier, (ii) a sender of the e-communication, (iii) one or more recipients of the e-communication, and (iv) a date on which the e-communication was sent or posted;
      a second set of codes for causing a computer to identify, for each of the plurality of e-communications, (v) an identifier for at least one of the sender and the one or more recipients, and (vi) a geographic work location for the at least one of the sender and the one or more recipients;
      a third set of codes for causing a computer to generate and submit an e-communication deletion candidate file that lists at least a portion of the plurality e-communications as e-communication deletion candidates and includes, for each listed e-communication, (i)-(vi);
      a fourth set of codes for causing a computer to, in response to submitting the e-communication deletion candidate file, apply a plurality of rules and policies to each of the e-communication deletion candidates in the e-communication deletion candidate file to determine, for each of the e-communication deletion candidates, based on (i)-(vi), a disposition decision, wherein the plurality of rules and policies include at least (a) legal hold status of the at least one of the sender and the one or more recipients, and (b) deletion requirements of the geographic work location of the at least one of the sender and the one or more recipients, and wherein the disposition decision includes one of delete the e-communication from within e-communication archiving system or retain the e-communication within the e-communication archiving system;
      a fifth set of codes for causing a computer to generate a disposition decision file, wherein the disposition decision file lists the electronic communications and includes a corresponding disposition decision;

a sixth set of codes for causing a computer to determine current processing demands for determining disposition decisions exceed a predetermined processing demand threshold based on a comparison between a first volume of e-communication deletion candidates submitted for disposition decisions in comparison to a second volume of disposition decisions in one or more disposition decision files; and a seventh set of codes for causing a computer to, in response to determining that the current processing demands exceed the predetermined processing demand threshold, delay submission of subsequent e-communication deletion candidate files until processing demand is determined to be below the predetermined processing demand threshold.

15. The computer program product of claim 14, further comprising an eighth set of codes for causing a computer to communicate a deletion task to the e-communication archiving system based on deletion disposition decisions in one or more disposition decision files;

a ninth set of codes for causing a computer to, in response to communicating the deletion task to the e-communication archiving system, receive e-communication deletion data from the e-communication archiving system that indicates which e-communications associated with the deletion task were deleted and which e-communications associated with the deletion task were unable to be deleted; and a tenth set of codes for causing a computer to generate an e-communication deletion confirmation file which includes e-communications that were deleted and e-communications that were unable to be deleted.

16. The computer program product of claim 14, wherein the second set of codes are further configured to cause the computer to identify the identifier for at least one of the sender and the one or more recipients by accessing a unified user directory that lists identifiers of users based on corresponding e-communication addresses and identify the geographic work location for the at least one of the sender and the one or more recipients by accessing an enterprise-wide reference data repository that lists geographic work locations based on the identifiers of the users.

17. The computer program product of claim 14, wherein the plurality of e-communications (i) are defined as regulated e-communications sent or received by users having a regulated status, wherein the regulated status is based on a user's requirement to process non-public information, and (ii) meet a minimum predetermined time requirement for storage within the e-communication archiving system.

\* \* \* \* \*